INVENTOR.
Marcel Musso

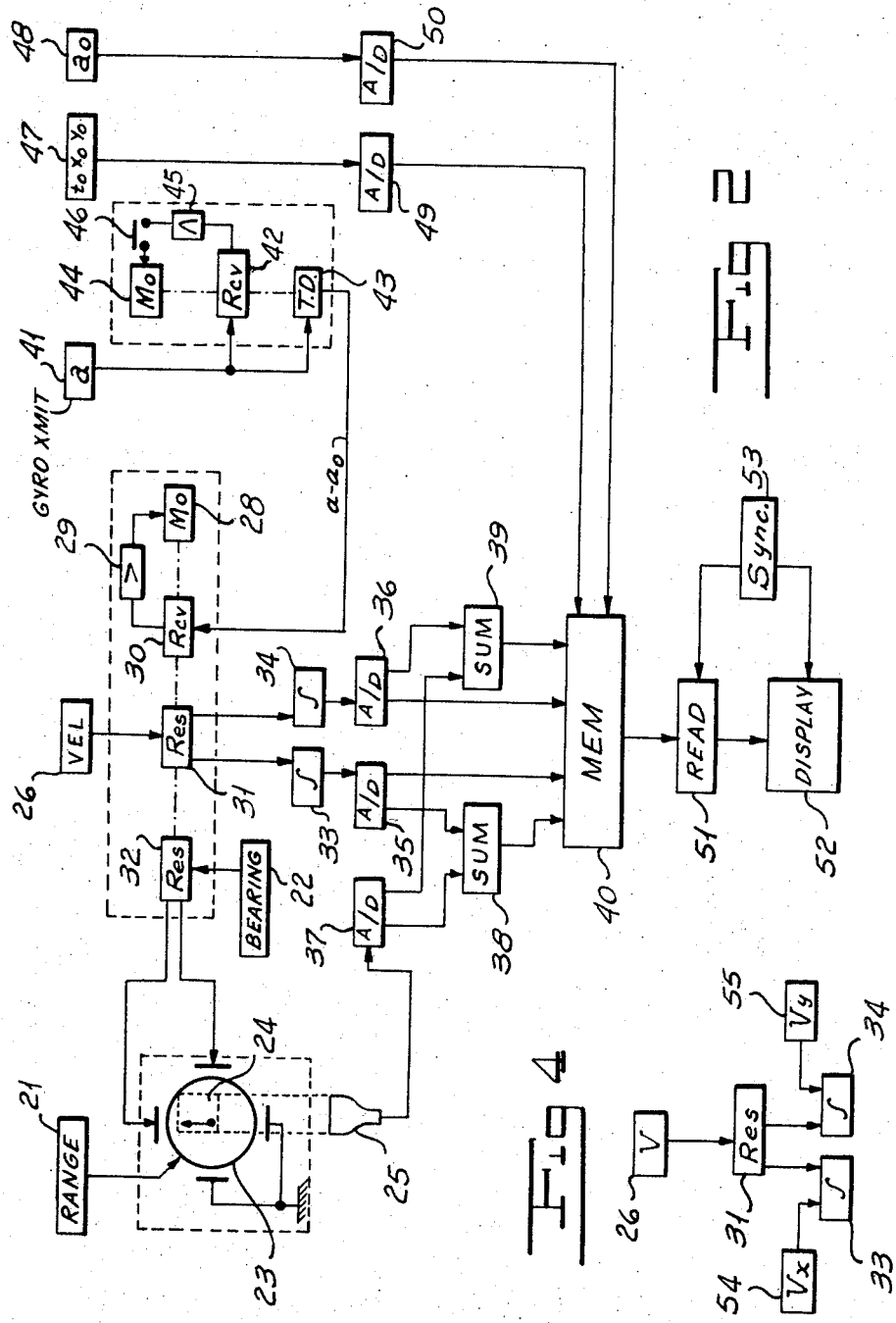

United States Patent Office 3,368,217
Patented Feb. 6, 1968

3,368,217
COURSE TRACING DEVICE
Marcel Musso, Montrouge, France, assignor to Precilec, Paris, France, a company of France
Filed July 7, 1966, Ser. No. 563,605
Claims priority, application France, July 13, 1965, 24,447
4 Claims. (Cl. 343—5)

ABSTRACT OF THE DISCLOSURE

A course tracing device which contemplates the resolution of range and relative bearing information from a standard shipboard radar into cartesian distance components parallel to and orthogonal to some given reference direction such as the heading of the ship at some past instant of time. The ship velocity along its heading axis is resolved into cartesian velocity components parallel to and orthogonal to the reference direction. These velocity components are integrated to obtain the components of distance traversed by the ship from some initial origin. Corresponding distance components are added to give the cartesian distance components of a target from the initial origin. The distance components corresponding to the position of the ship relative to the origin and the combined distance components corresponding to the position of the target relative to the origin are stored at periodic intervals and then coupled to a display device. Upon the display device will be seen tracks representing the true motion of the ship and the true motion of the target.

Background of the invention

The problem of navigation in heavily trafficked areas, the English Channel for instance, poses a very acute problem. The density of ships is such that safety is much reduced. The complexity of the problem is aggravated when the visibility is bad. Navigation by radar does not solve the problem.

Essentially, radar indicates the direction and distance to an object furnishing an echo with respect to axes fixed on the ship. Although it is relatively easy to follow on the screen of a cathode ray tube the relative movement of the echoes, it is very difficult to deduce from this the track of another ship. (Radar in essence does not indicate the course of the other ship; this furnishes an explanation of collisions taking place during navigation by radar while following the rules of the road.)

Also, the establishment by insurance companies of the responsibility of each ship in case of collision is always very difficult because of the lack of evidence bearing on the events preceding collision.

The present invention has for its objective the realization of a device to trace courses permitting one to remedy the aforementioned problems, while not requiring much supplementary instrumentation on board which will have to be installed ashore.

One object of my invention is to determine the actual course or track of a target.

Another object of my invention is to translate the target position measured relative to a moving craft into target coordinates fixed relative to the earth.

Still another object of my invention is to periodically store the translated target coordinates in a memory.

A further object of my invention is to utilize the stored target coordinates to actuate a visual display device which traces the actual track of the target over the earth.

Other and further objects of my invention will appear from the following description.

Summary of the invention

In general my invention contemplates the use of information from a sweep radar fixed or mobile to obtain on a cathode ray tube a picture referenced to a coordinate system fixed in space. This image is composed of a plan view of the fixed elements and the trajectory of moving elements.

The duration in which this course tracer is usable depends on the field of view of the sweep radar and the speed of the moving elements in the field of view.

For clarity of explanation I will describe first the operation of the device which uses the basic information from a fixed sweep radar.

The procedure consists of resolving in total or in part the picture or the signals provided by a sweep radar onto a cartesian coordinate grid having one axis parallel to an azimuth direction chosen by the operator.

The information is digitized and stored in for example, a magnetic drum memory, a disc memory, or a ferrite memory.

The preceding result is obtained with the help of a non-destructive writing head which periodically places into the memory different radar images. In this case, the state of the memory represents an identical picture to that which one would obtain by the superposition of successive photographs beginning at a given time.

A reading head periodically sweeps the memory non-destructively and the digital information thus obtained is supplied to a cathode ray tube which reconstitutes at each sampling the total of images from the sweep radar.

In choosing a convenient digitization for the memory and the cathode ray tube, it is desirable to regulate the distance on the tube between each point. Since the persistence on the screen is a function of the sweep speed, the paths of the moving elements will appear on the screen without discontinuity.

The resolution of the screen permits one to incorporate messages such as the time and the azimuth reference.

The operator can at any instant he chooses erase the memory and record the trace from any new origin of time and new azimuth angle.

If we now consider a shipboard radar, one may add a course computer the precision of which is compatible with the course tracer.

This device may comprise a velocity measuring device and a computer to convert velocity vectors to the reference cartesian coordinate axes. These velocity vectors are integrated and the distances thus obtained are converted to digital information in some convenient form.

These digitized distances are added algebraically to the digital information supplied by the sweep radar so that one could put into the memory information with respect to axes fixed in space. These distances also can be put into the memory to make it appear on the screen as if the trajectory started from the centerpoint of the screen.

As in the preceding case, the trace is completed by the time, the azimuth reference, which would be the angle that the boat makes with the origin, the latitude and longitude of the origin, and any other information which one would judge to be useful.

Note here that such a device requires no modification of existing shipboard equipment and does not disturb existing devices.

The operator can put this device in the mode that he judges most useful. He can, if he wants, save the data in a memory for a certain time until he returns to land or at his discretion see the stored events with respect to some other reference origin.

In the case of a movable radar, the reconstitution of the picture with respect to axes fixed in space will show the true trajectory and as a consequence, eliminate errors which result from faulty interpretation of relative motion.

Finally, an echo fixed for a certain time which begins to move would form a new trajectory whose meaning is unambiguous.

*Description of the drawings*

In the accompanying drawings which form part of the instant specification and which are to be read in conjunction therewith:

FIGURE 2 is a more detailed schematic view showing one embodiment of a course tracing device according to my invention.

FIGURE 4 is a fragmentary schematic view showing a variation in the embodiment of the device shown in FIGURE 2 in which velocity correction factors are introduced to compensate for drift in the transformation into axes fixed in space.

Figure 3:
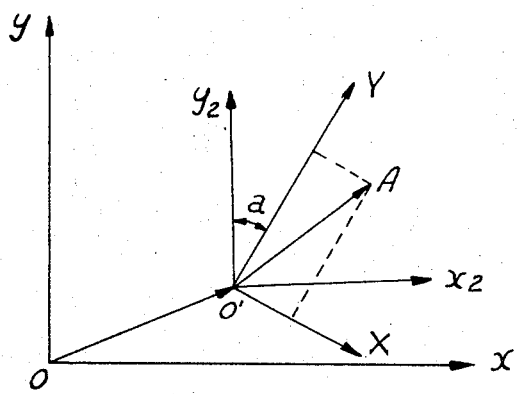
FIGURE 3 is a vector diagram showing the geometrical relationships.

More particularly, referring now to FIGURE 3, $xOy$ represents the reference axes. That is to say, the system of axes defined by point O which finds itself at the center of the radar support, or at the center of the ship, at the instant that the apparatus is started (or at any time one wishes) and the direction $Oy$ corresponds to the heading angle of the ship at such time.

At a later time the ship is at $O'$ and its heading is defined by the direction $O'Y$. The shipboard radar gives the position of an echo A, with reference to a system of axes $XO'Y$ lying on the ship.

The system of axes $x_2O'y_2$ is parallel to the reference system $xOy$.

In this case depicted the initial heading would be zero and the heading at the instant considered is $a$. In the general case the heading at the origin is $a_0$, and the heading at the instant considered is $a$.

The device which is the object of this invention permits one to represent on a map the fixed echoes and the path of the moving elements by solving the vector equation $$\overline{OA} = \overline{OO'} + \overline{O'A}$$

In this equation the term $\overline{OA}$ is what one desires to see on a screen. The term $\overline{OO'}$ corresponds to the resultant of ship displacements and is determined by a calculated figure from the velocity indicator which is on the ship. The term $\overline{O'A}$ is defined with reference to axes $YO'Y$ of the shipboard radar and these are converted into parallel reference axes $x_2O'y_2$.

Figure 1:
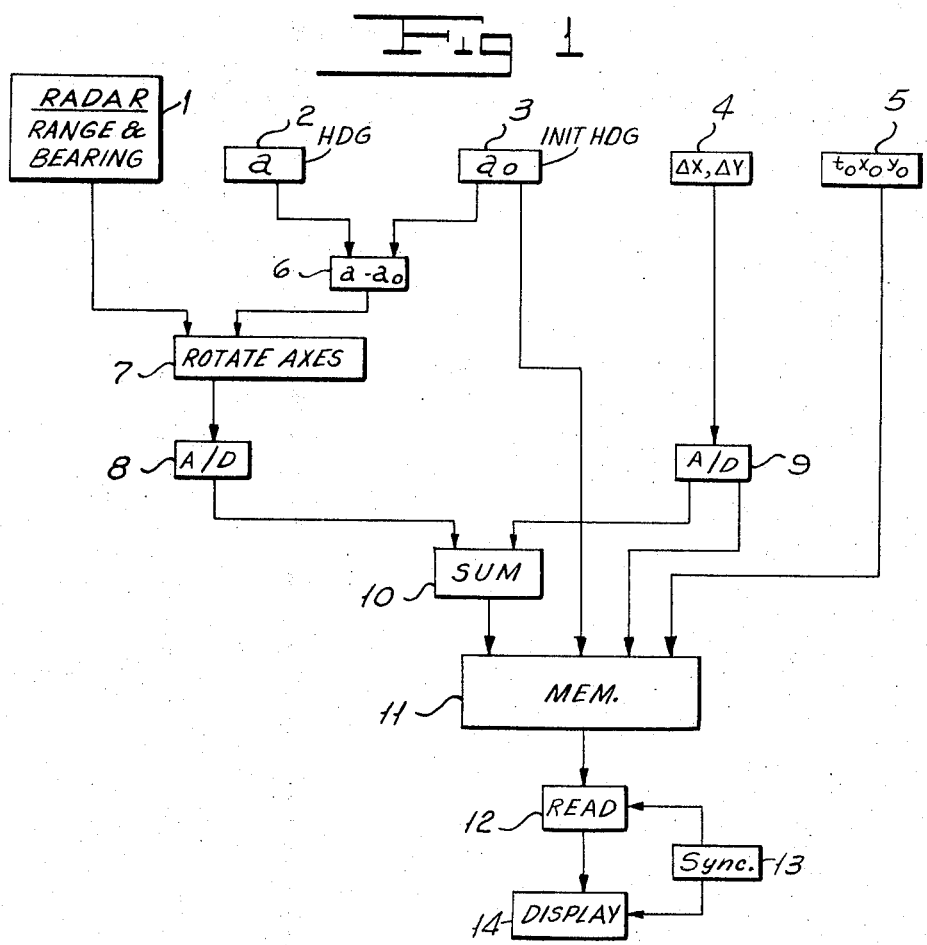
FIGURE 1 is a diagrammatic view showing an embodiment of my course tracing device in the case where a shipboard radar is used.

On FIGURE 1 the radar 1 provides range and bearing information. The indication $a$ of the heading is supplied by a gyro transmitter 2, for example. The indication $a_0$ of the heading at the origin is derived by 3, and transmitted to a memory 11. The coordinates $\Delta X$ and $\Delta Y$ of the ship (point $O'$) are furnished by 4, which results from data from a speed indicator, for example. The initial data (point O) at some time and space $(t_0x_0y_0)$ are furnished by manual inputs 5 and also put into the memory 11. The variation in heading angle between the points O and $O'$ is determined in 6 by the subtraction $(a-a_0)$ whose resultant is coupled to device 7 which rotates axes from a system of coordinates $XO'Y$ to the system $x_2O'y_2$.

In digitizers 8 and 9, the conversions take place from the analog terms utilized previously. They are quantified and put into a cartesian grid of axes $xOy$ in which a value is given for each line and each point of a line.

The results of the conversion that took place in digitizer 8 correspond to the term $\overline{O'A}$ with respect to axes $x_2O'y_2$; and the conversion performed in digitizer 9 corresponds to the term $\overline{OO'}$ with respect to axes $xOy$.

The result corresponding to term $\overline{OO'}$, that is to say, the path of the ship, is put into memory 11.

The summation $(\overline{OO'} + \overline{O'A})$ takes place in summer 10 and the result corresponding to the term OA is also put into memory 11.

The memory 11 contains thus all the terms; fixed echoes, trajectories of the moving echoes, and the trajectory of the ship which carries the radar all referenced to coordinates at time zero, and are capable of being displayed.

Periodically, a reading head 12 scans the memory and transmits the signals read to a cathode ray tube 14 to result in the entire digitized information appearing on the screen. The synchronization of the sweep is assured by a synchronizer 13.

The detail of the different elements in the different operations is now explained by reference to FIGURE 2.

The transmitter 41 of the gyroscope furnishes an indication of the heading to a synchro receiver 42, controlled by motor 44, which is electrically excited by an amplifier 45 through a switch 46.

At time zero, a switch 46 is opened and an angular indication of initial heading, $a_0$, is held. Motor 44 also drives a synchro differential transmitter 43, which from now on furnishes an indication of the differential angle of the gyroscope 41 $(a-a_0)$.

The difference is transmitted to a synchro receiver 30, controlled by servomotor 28 through an amplifier 29. This motor 28 also controls resolvers 31 and 32 and causes a coordinate rotation by angle $(a-a_0)$. This converts the coordinates of the points A (FIGURE 3) of system $XO'Y$ lying on the ship to system $x_2O'y_2$ parallel to the reference system.

The resolver 32 is excited by the sweep 22 of the radar in accordance with the relative bearing of the antenna and displays on screen 23 of the shipboard radar 21 a rotation $(a-a_0)$ of the axes lying on the ship, such that the picture furnished is referenced to the initial angle $a_0$.

The television camera 25, positioned to view all or part (for example, area 24) of the screen 23, converts this picture into two rectangular coordinate axes.

Then the picture is scanned and it is possible to analyze the signals that result. The result of this analysis is transmitted to a digitizer 37, which transforms the preceding analog information into digital information referenced to a cartesian system of axes parallel to the reference system. This digitizer 37 furnishes digital-form information on coordinates $(x_2y_2)$ of point A (FIGURE 3).

Information concerning the course of the ship is furnished by a velocity measuring device 26. This information is referenced to a coordinate system $xOy$ by resolver 31, which has been described already. Then it is transmitted to two integrators, 33 and 34, which give coordinates $\Delta X$ and $\Delta Y$ of the ship situated at $O'$.

The two digitizers, 35 and 36, cause transformation of the preceding analog information into digital information.

The summation of digital information thus obtained is effected by summers 38 for the abscissa and 39 for the ordinate, in such a manner to furnish for each one of the components of vector $\overline{OA}$ the result of the sum $(\overline{OO'} + \overline{O'A})$. The elements corresponding to $\overline{OO'}$ have been furnished by conversion devices 35 and 36; and the elements corresponding to $\overline{O'A}$ have been furnished by conversion device 37.

The data concerning the angle at the origin, the latitude and longitude of the origin point, the time of starting the course tracer, the time at the instant of each reading furnished by different manual inputs symbolized by 47 and 48, and elaborated in 49 and 50 in digital form, are transmitted to memory 40 which stores them. The memory 40 will also receive digital information from conversion devices 35 and 36, and the summation in 38 and 39.

Analysis of memory 40 is made periodically by reading head 51 which transmits to the cathode ray tube 52 digital information. Synchronizer 53 assures sweep synchronization between screen 52 and memory 40.

In the case where the radar is mounted on a base (ship for example) which is situated in a velocity field (ocean currents) the reference system may be corrected by determining the average value of the drift.

On the screen of the cathode ray tube 52, echoes from fixed objects will appear to move where the drift is not corrected.

To correct back to reference axes fixed in space one could use for example, a two potentiometer system manipulated by the operator, each one giving correction information according to the rectangular axes of the screen, and having as their object the fixing of the picture of immobile objects. These two correction potentiometers 54 and 55 are shown in FIGURE 4.

The purpose of these devices is twofold. One purpose is to permit one to prevent the representation of trajectories for objects fixed in space. The other is to permit one to see the direction of the relative speed with respect to these fixed objects and hence to reference axes fixed in space. That is to say, it permits one to compensate for drift.

Each time that the craft position has sufficiently changed that its track on screen 52 becomes too far removed from the center to present potentially hazardous objects seen on screen 23, the origin may be repositioned either coincident with or some distance ahead of the present position of the craft. Thus only the more recent portions of the track need be retained in the memory. Said another way, the craft position and any target appearing on the indicator become increasingly displaced with respect to the reference point and they appear as a track on the indicator. Using a sequence of operations like this avoids storing the whole track in the memory.

In the example considered, the frequency which the indicator uses is relatively slow. (In the order of one interrogation per second interrupted by any appropriate means.) The device which initiates the analysis could be made in the following way. Each time that the digitizers 35 and 36 show the trajectory of the craft with reference to a system of axes undergoing change periodically, there is initiated first a cessation of computation on the other axis, a cyclical interrogation, then a supplementary analysis on the radar image and finally a return to the initial mode of periodic sampling.

Such a device combines the periodic systematic analysis with a certain number of detached supplementary analyses, each time that the ship moves by an amount which corresponds to the chosen increment.

It will be seen that I have accomplished the objects of my invention. The actual course or ground track of a target is determined by translating relative target position into absolute target position. The translation is effected in response to changes in craft position. Information relating to the positions of the target and the craft are stored to actuate a display device which traces the ground tracks of the target and the craft.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A navigational aid for a craft having a heading axis including in combination means for establishing a reference direction, first means responsive to the reference direction means for providing the position of an object relative to the craft in first cartesian distance components parallel to and orthogonal to the reference direction, means for determining the velocity of the craft along it heading axis, means responsive to the determining means for resolving craft velocity into cortesian velocity components parallel to and orthogonal to the reference direction, means responsive to the resolving means for integrating each cartesian velocity component to provide second cartesian distance components, and means responsive for the first means and the integrating means for algebraically combining corresponding ones of the first and second distance components.

2. A navigational aid as in claim 1 in which the means establishing a reference direction comprises means for storing a representation of the heading of the craft at a given instant of time.

3. A navigational aid as in claim 1 for a craft operating in a drifting fluid medium which further includes means coupled to the integrating means for modifying the cartesian velocity components in accordance with the components of drift velocity parallel to and orthogonal to the reference direction.

4. A navigational aid as in claim 1 in which the first means comprises means for determining the distance and the direction of the object from the craft, a cathode ray tube actuatable to provide an illuminated display, means responsive to said distance and direction determining means for actuating the cathode ray tube, a camera tube positioned to respond to the illuminated display, and means responsive to the camera tube for providing the position of the object relative to the craft in cartesian coordinates.

References Cited

UNITED STATES PATENTS 3,114,908  12/1963  Hall _____ 343—5

RODNEY D. BENNETT, *Primary Examiner.*

RICHARD A. FARLEY, *Examiner.*

C. L. WHITHAM, *Assistant Examiner.*